(12) United States Patent
Zhang

(10) Patent No.: US 11,496,654 B2
(45) Date of Patent: Nov. 8, 2022

(54) PROJECTION-TYPE VIDEO CONFERENCE DEVICE AND SYSTEM THERE OF

(71) Applicant: AMPULA INC., Bellevue, WA (US)

(72) Inventor: Yajun Zhang, San Jose, CA (US)

(73) Assignee: AMPULA INC., Bellevue, WA (US)

( * ) Notice: Subject to any disclaimer, the term of this patent is extended or adjusted under 35 U.S.C. 154(b) by 0 days.

(21) Appl. No.: 17/204,897

(22) Filed: Mar. 17, 2021

(65) Prior Publication Data

US 2022/0303434 A1  Sep. 22, 2022

(51) Int. Cl.
*H04N 5/225* (2006.01)
*H04N 7/14* (2006.01)
*H04N 5/232* (2006.01)
*H04L 65/403* (2022.01)

(52) U.S. Cl.
CPC ......... *H04N 5/2252* (2013.01); *H04L 65/403* (2013.01); *H04N 5/23238* (2013.01); *H04N 5/23299* (2018.08); *H04N 7/142* (2013.01); *H04N 7/147* (2013.01)

(58) Field of Classification Search
CPC ......... H04L 29/06; H04L 65/403; H04N 7/15; A63F 2009/2435
USPC ................... 348/14.08, 14.09, 14.1, 373
See application file for complete search history.

(56) References Cited

FOREIGN PATENT DOCUMENTS

| CN | 107135207 | * | 9/2017 | ............. H04L 29/06 |
| CN | 210899295 | * | 11/2019 | ............. H04N 5/225 |

* cited by examiner

*Primary Examiner* — Yosef K Laekemariam

(57) ABSTRACT

A projection-type video conference device comprises a camera assembly configuring to acquire a panoramic video of a conference scene, an audio input assembly configuring to collect voice signals of the conference scene, a projection assembly configuring to display images or information of a conference video and an audio output assembly configuring to broadcast a voice signal of the projection assembly or a voice signal of the audio input assembly, wherein the camera assembly is embedded in a housing of the projection-type video conference device and is liftable. And a projection-type video conference system comprises projection-type video conference devices which are connected with each other.

14 Claims, 2 Drawing Sheets

PROJECTION-TYPE VIDEO CONFERENCE DEVICE AND SYSTEM THERE OF

TECHNICAL FIELD

The present disclosure relates to the technical field of video conference, and particularly to a projection-type video conference device, and a projection-type video conference system.

BACKGROUND

At present, there are usually two kinds of video conference systems. One kind is a large screen conference system, which is composed of a TV screen, a camera, a microphone, a speaker, a remote control and a computer. The camera is usually installed on the top of the TV screen so as to maximize the capture of the conference scene. However, for this kind of conference system, an overlap phenomenon occurs in case of too many people. In an implementation, after the captured video is transmitted to a remote end, some people can be displayed clearly, but those people located a bit further back are either overlapped with or blocked by others, or cannot be clearly displayed for being too far away from the camera. The microphone and speaker are usually far away from the TV screen, and arranged on a conference table to facilitate the collection of voice information from conference participants and the broadcasting of the voice information sent from another party joining the conference. Since the audio and video devices are independent of each other, synchronization distortion happens in case of poor network performance, which degrades the quality of the conference. The computer may be configured to start and manage video conferences, share screens, or the like. This kind of video conference system needs to be installed in advance, and the conference room therefor is relatively fixed; in this case, various wires, such as TV power cord, camera power cord, High-Definition Multimedia Interface (HDMI) data cable, microphone cables or Universal Serial Bus (USB), need to be connected to the table through the floor, which is neither beautiful nor convenient to use for the collaboration work with multiple devices.

The other kind is a small screen conference system, aiming at video conferences between individuals. On the basis of digital telephone devices for which a display screen and a camera are built in, the video can be displayed to each other after the call may be connected, but it is not suitable for a conference scene requiring for screen sharing due to the limited size of the screen and the limited viewing angle of the camera, and is not suitable for conferences among groups. In addition, such video conference system requires the support from an Ethernet interface and a digital telephone gateway which locations are relatively fixed, and thus it is not suitable for business travel and family use.

SUMMARY

The disclosure provides a projection-type video conference device, comprising: a camera assembly configured to acquire a conference video of a conference scene, an audio input assembly configured to collect voice signals of the conference scene, a projection assembly configured to display images or the conference video, an audio output assembly configured to broadcast voice signals of the projection assembly or voice signals of the audio input assembly, wherein the camera assembly is arranged in the housing of the projection-type video conference device and is liftable;

In other aspect, the disclosure further provides a projection-type video conference system, which includes the projection-type video conference devices connected with each other, and each of the video conference devices comprising: a camera assembly configured to acquire a panoramic video of a conference scene; an audio input assembly configured to collect voice signals of the conference scene; a projection assembly configured to display images or information of a conference video; an audio output assembly configured to broadcast a voice signal of the projection assembly or a voice signal of the audio input assembly, wherein the camera assembly is embedded in a housing of the projection-type video conference device and is liftable.

BRIEF DESCRIPTION OF THE DRAWINGS

In order to more clearly explain the technical solutions in the embodiments of the present disclosure, drawings needed for the description of the embodiments will be simply introduced below. Obviously, the drawings mentioned hereafter just illustrate some embodiments of the present disclosure. For those of ordinary skill in the art, other drawings may also be obtained from these drawings without any creative work. In the drawings.

The present disclosure will be further described in the following embodiments with reference to the accompanying drawings.

DETAILED DESCRIPTION OF PREFERRED EMBODIMENTS

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments thereof. Based on the embodiments in this disclosure, all other embodiments, obtained by those skilled in the art without any creative work, shall fall within the protection scope of this disclosure.

The present disclosure aims to solve the problems in the existing projection-type video conference systems, and provide a new video conference experience to the users. A projection-type video conference device is provided by embodiments of the present disclosure, which is portable, does not need to be wired, and can be used at any time as required. It integrates high-definition panoramic audio and video, replaces the traditional TV screen or monitor with high-definition and high-brightness projection assembly, and makes the projection size adjusted according to the projection distance. It is suitable for group meetings as well as family and personal use, and has a low cost. Furthermore, it can be configured and managed through a mobile phone or a computer. With the assistance of various functional modules of the cloud service system, an optimal point-to-point video connection with another conference device can be established, to provide an optimal video conference effect.

Compared with prior art, the disclosed projection-type video conference device integrated with a camera assembly, a projection assembly, an audio input assembly and an audio output assembly. With a relative high integration, the camera assembly is configured to acquire a conference video of a conference scene and provides a high definition and panoramic video in real-time, the projection assembly is configured to display the panoramic video collected by the camera assembly or video sent from other party of the conference, and when there is no need for video service, the user can control the camera of the camera assembly to drop down and hide the camera in the housing of the projection-type conference video device, so as to project the user's privacy.

Figure 1:
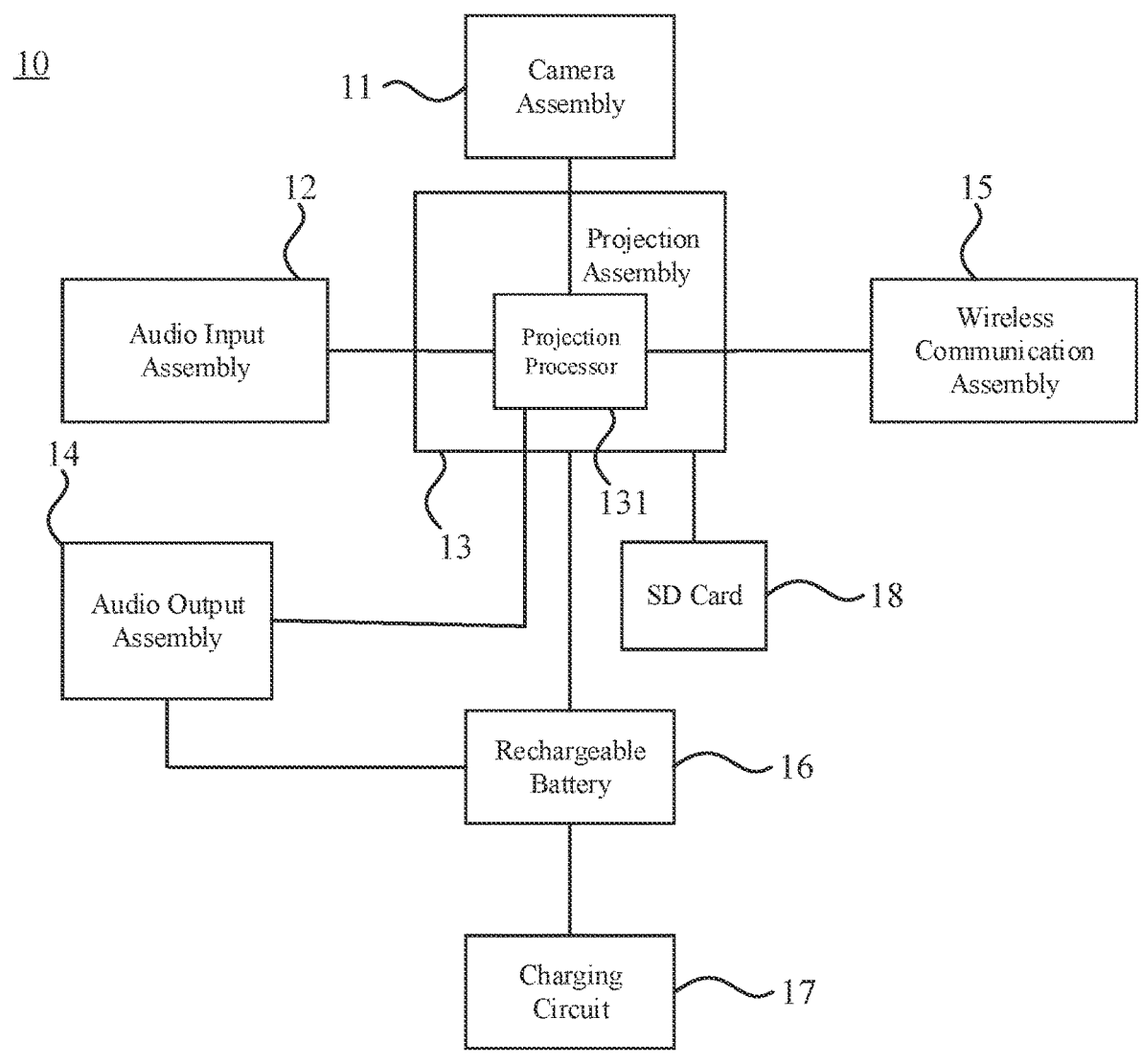
FIG. 1 is a schematic structural diagram illustrating a projection-type video conference device according to an embodiment of the present disclosure.
Figure 2:
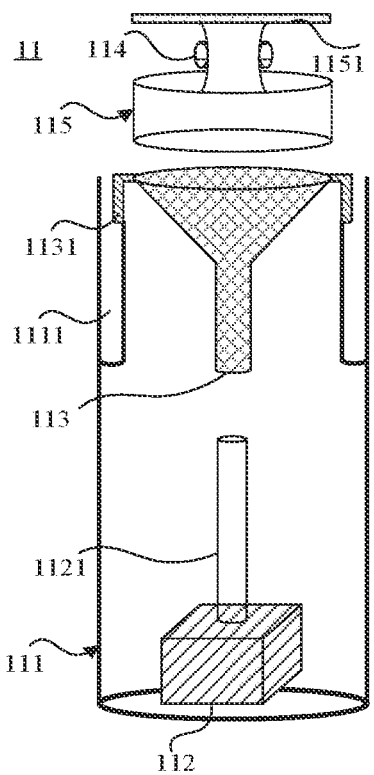
FIG. 2 is a schematic diagram illustrating a camera assembly illustrated in an embodiment of FIG. 1.

Referring to FIG. 1 and FIG. 2, FIG. 1 is a schematic structural diagram illustrating a projection-type video conference device according to an embodiment of the present disclosure, the projection-type video conference device 10 may include a camera assembly 11, an audio input assembly 12, a projection assembly 13 and an audio output assembly 14.

The camera assembly 11 may be configured to acquire panoramic video of a conference scene. The camera assembly 11 may include a camera. The camera may include a wide-angle camera, and it may be a 360-degree panoramic camera or a camera covering a part of the scene. Two or three wide-angle cameras may be adopted. Each wide-angle camera may support a resolution of 1080P or 4K or more. The videos captured by all the wide-angle cameras may be spliced together by means of software to generate high-definition videos of the 360-degree scene, with such generated high-definition panoramic video remained at the resolution of 1080P. During the conference, all participants in the conference may be tracked in real time and the speakers may be located and identified, by performing artificial intelligence (AI) image analysis on the panoramic video. The camera assembly 11 may transmit the captured image information to the projection assembly 13.

The audio input assembly 12 may be configured to collect voice signals. The audio input assembly 12 may be a microphone, or may adopt an array of microphones supporting 360-degree surround in the horizontal direction. For example, it can adopt an array of 6 digital Micro Electro Mechanical System (MEMS) microphones, which are evenly and circumferentially distributed in the horizontal plane and each have a function of Pulse Density Modulation (PDM), for interaction with near and far fields; alternatively, it may adopt an array of 6+1 microphones, with one microphone located in the center to capture far-field audio. In an implementation, the array of digital microphones may suppress sound pickup in non-target directions by means of beamforming technology, thus suppressing noise, and it may also enhance the human voice within the angle of the voice source, and transmit the processed voice signal to a digital signal processing module 1311 of the projection assembly.

The projection assembly 13 may be configured to display video information of the conference. For example, the projection assembly may display video of an input signal from a computer or an external electronic device, or may also display the panoramic video captured by the camera assembly or another conference scene video sent from the another conference device. The conference's screen information to be displayed may be selected on a conference system application installed on the computer and the external electronic terminal. In an implementation, the projection assembly 13 may include the projection processor 131, and the projection processor 131 may be configured to perform the subsequent processing on the voice signals output by the audio input assembly 12, receive videos sent from other devices, and perform projection display. The projection processor 131 may also configured to perform partial identification and delineation on the images of the participants in the conference by means of image analysis and processing algorithms, and then project the images after being subject to partial identification and delineation, in horizontal or vertical presentation, onto an upper side, lower side, left side or right side of the projection area. The projection processor may also be configured to assist the array of microphones in positioning, focusing or magnifying the sound of the speaker in the video conference, by means of the image analysis and processing algorithms.

Preferably, since a laser has advantages of for example high brightness, wide color gamut, true color, obvious orientation and long service life, the projection assembly 13 may adopt a projection technology based on a laser light source, and the output brightness may be 500 lumens or more. As such, the projection-type video conference device 10 may output videos having a resolution of 1080P or more, and may be used to project the video coming from the another party joining the conference or realize screen sharing of the electronic terminal devices such as computers or mobile phones. It can be understood that the projection assembly 13 is not limited to adopting the projection technology based on a laser light source, and may also adopt a projection technology based on an LED light source.

The audio output assembly 14 may be configured to play the audio signal sent from the projection processor 131 or the main processor. It may be a speaker or a voice box, and may be for example a 360-degree surround speaker or a locally-orientated speaker.

Continuing to refer to FIG. 1, the projection-type video conference device 10 may further include a wireless communication assembly 15, which may access Internet 50 through WIFI and may access the video conference with the assistance of the cloud service system 20, where the cloud service system 20 may also accesses the Internet 50. It should be noted that the cloud service system is an online service based on cloud computing and provided by Internet, usually provides dynamic status and easily expandable personalized services through Internet. In an implementation, the wireless communication assembly 15 may be a WIFI wireless communication assembly.

Continuing to refer to FIG. 1, the projection-type video conference device 10 may have a detachable rechargeable battery 16 and a charging circuit 17 which are built-in the projection-type video conference device. The rechargeable battery 16 may be connected to and power the camera assembly 11, the projection assembly 13, the audio input assembly 12 and the audio output assembly 14. The charging circuit 17 may be connected to the rechargeable battery 16, for charging it.

Since the rechargeable battery 16 is adopted to supply power, the projection-type video conference device 10 may be convenient to carry and use at any time as required. Each charge may support a video conference of for example four hours or an audio conference of a longer time. If the battery level is low, the battery may be charged through a USB port or a DC adapter interface.

Referring to FIG. 2, FIG. 2 is a schematic diagram illustrating a camera assembly illustrated in the first embodiment. The camera assembly is configured to acquire a panoramic video of a conference scene and the camera assembly 11 is embedded in the housing of the projection-type video conference device and is liftable, as shown in FIG. 2. The camera assembly includes a bracket 111, a motor 112, a lifting platform 113 and a camera 114, the motor 112 and the lifting platform 113 are arranged in the bracket 111, and the lifting platform 113 is arranged on the motor 112, the camera 114 is arranged on the lifting platform 113. In an implementation, as shown in FIG. 2, the camera assembly 11 further includes a bearing structure 115, the camera 114 may arranged on the bearing structure 115 and the bearing structure 115 is arranged on the lifting platform 113, the camera 114 may be a wide-angle camera, and it may be a 360-degree panoramic camera or a camera covering a part of the scene. Two or three wide-angle cameras may be adopted. Each wide-angle camera may support a resolution of 1080P or more. The videos captured by all the wide-angle cameras may be spliced together by means of software to generate high-definition videos of the 360-degree scene, with such generated high-definition panoramic video remained at the resolution of 1080P. All participants can be tracked in real time by performing artificial intelligence (AI) image analysis on the panoramic video during the conference, and the speakers can be located and identified.

Further, a base of the motor 112 is fixed on the bottom of the bracket 111, and the motor 112 is configured to work after receiving instructions sent by the projection-type conference video device 10. In an implementation, when the motor receives an instruction of turning on the projection-type video conference device, the motor is turned on and drive the lifting platform to bring the camera move up so as to move out of the bracket; and the motor is turned on and drive the lifting platform 113 to bring the camera move down so as to hide the camera 14 inside the bracket 111 when the motor receives an instruction of turning off the projection-type video conference device. In an implementation, the motor 112 may be a miniature direct-circuit screw rod-type rotary motor, and the bearing structure 115 is further includes a protective board 1151 which is arranged at a side of the bearing structure 115 that is opposite to the lifting platform 113, and a size of the projective board 1151 may be when that camera 114 is hidden inside the bracket, the protective board 1151 covers the bracket 111 and is flush with a surface of the housing of the projection-type video conference device 10. On the one hand, by setting the protective board 1151, it realizes dust prevention when the camera is not working, and on the other hand, it makes the projection-type video conference device have a complete appearance.

In an implementation, the camera assembly 11 may be flexibly and manually moved out or hidden in the bracket 111. Particularly, the user can appropriately press the protective board 1151 of the camera assembly 11 so as to move the camera 114 down and hide it inside the bracket 111, and when the protective board 1151 is pressed again, the camera 114 is moved out of the bracket 111 and the camera 114 begins to work. In an implementation, the protective board 1151 is provided with a button, the user can press the button so as to move the camera 114 down and hide it inside the bracket 111, and when the protective board 1151 is pressed again, the camera 114 is moved out of the bracket 111 and the camera 114 begins to work.

In an implementation, the bearing structure 115 may fixed with the lifting platform 113 by mechanical buckles or screws, which form a mobile sub-assembly, the lifting platform 113 moves up or down and brings the bearing structure 115 thereby the camera 114 to move up or down. The motor 112 includes a vertical screw rod 1121, the lifting platform 113 has a shape of hollow funnel. The lifting platform includes a protrusion portion and a round platform which is arranged on the protrusion portion. The protrusion portion is provided with screw threads and forms a threaded sleeve, the protrusion portion may be able to sleeve with the vertical screw rod 1121. The vertical screw rod 1121 and the protrusion portion is respectively provided with internal screw threads and external screw threads so that the threaded sleeve and the vertical screw rod 1121 form a screw subgroup. The round platform is provided with protruding buckles 1131 at opposite sides, and the bracket 111 is provided with slots 1111 at an inner side of the bracket 111 that fits with the protruding buckles 1131 of the round platform, so that the protruding buckles 1131 may slide up or down in the slots 1111.

It should be noted that, in this embodiment, the camera 114 is provided on the bearing structure 115, and the camera 114 is connected to the lifting platform 113 through the bearing structure 115. However, in another embodiment, the camera 114 may be directly provided on the lifting platform 113 so that the lifting platform 113 can directly bring the camera 114 to move up and down.

In an implementation, the camera assembly 11 further includes a pressure sensor and a camera processor. The pressure sensor is configured to detect an external pressure signal, and send the external pressure signal to an analog-to-digital (ADC) converter of the camera processor of the camera assembly 11 after amplifying it. The camera processor is configured to compare the magnitude between a pressure value of the amplified external pressure signal and a preset pressure threshold to determine whether a hidden instruction is received, i.e., whether an action of pressing is taken place. If the pressure value of the amplified external pressure signal is greater than the preset pressure threshold, it indicates that there is a pressing action, the camera processor may determine a rotating direction of the motor 112 according to the lifting history and the current position of the motor, and calculates the speed and rotation angle of the motor 112, and output the rotation control signal to the motor 112, so that the motor 112 brings the vertical screw rod 1121 to rotate, thereby brings the lifting platform 113 to move up or down. When the camera 114 moves down into the bracket 111, the protective board 1151 may physically shield the camera 114, so as to achieve the privacy protection function. It should be understood that, when there is no need to hide the camera 114, the camera processor may control the rotation direction of the motor 112, to reach the destination of moving out the camera 114 from the bracket 111.

Figure 3:
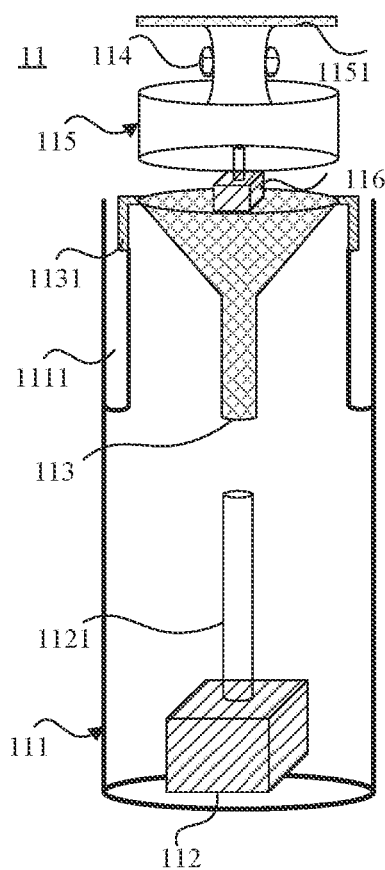
FIG. 3 is a schematic diagram illustrating a camera assembly illustrated in another embodiment of FIG. 1.

Referring to FIG. 3, FIG. 3 is a schematic diagram illustrating a camera assembly 11 illustrated in the second embodiment. The difference between the second embodiment and the first embodiment is that a second motor 116 is added. The second motor 116 is fixed on the lifting platform 113, a screw rod of the second motor is connecting to the bearing structure 115. In an implementation, the screw rod of the second motor 116 is connecting to the bearing structure 115 in a clamping mode instead of a threaded mode, that is, during the driving of the second motor 116, the vertical screw rod of the second motor 116 drives the bearing structure 115 to rotate instead of lifting, and the bearing structure 115 brings the camera 114 to rotate, so that the camera 114 can collect images in different directions on the conference scene.

The various embodiments in this specification are described in a progressive manner. Each embodiment focuses on the differences from other embodiments, and the same or similar parts between the various embodiments can be referred to each other.

The foregoing are only examples of this disclosure, and do not limit the scope of the disclosure. Any equivalent structure or equivalent process variants made on the basis of the contents of the specification and drawings of this disclosure, or direct or indirect application to other related technical fields, should all be included in the scope protection of this disclosure.

What is claimed is:

1. A projection-type video conference device, comprising:
a camera assembly configured to acquire a panoramic video of a conference scene;
an audio input assembly configured to collect voice signals of the conference scene;
a projection assembly configured to display images or information of a conference video;
an audio output assembly configured to broadcast a voice signal of the projection assembly or a voice signal of the audio input assembly;
wherein the camera assembly is embedded in a housing of the projection-type video conference device and is liftable;
wherein the camera assembly comprises a bracket, a motor, a lifting platform and a camera, wherein the motor and the lifting platform are arranged inside the bracket, a base of the motor is fixed on a bottom surface of the bracket, the camera is arranged on the lifting platform, the lifting platform is connected to the motor and the motor is configured to drive the lifting platform to rotate so as to bring the camera to move up or down;
wherein the camera assembly further comprises a bearing structure arranged on the lifting platform and the camera is arranged on the bearing structure; the lifting platform comprises a protrusion portion and a round platform which is arranged on the protrusion portion, wherein the protrusion portion is provide with screw threads, the round platform is provided with protruding buckles at opposite sides, and the bracket is provided with slots at an inner side of the bracket that fits with the protruding buckles of the round platform, and wherein the protruding buckles is configured to slide up or down in the slots; the motor comprises a screw rod and the protrusion portion is able to be fixed to the motor by sleeving the screw rod with the protrusion portion, wherein the screw rod and the protrusion portion is respectively provided with internal screw threads and external screw threads that are matched with each other.

2. The projection-type video conference device according to claim 1, wherein the motor is turned on and configured to drive the lifting platform to bring the camera to move up so as to move out of the bracket when the motor receives an instruction of turning on sent by the projection-type video conference device; and wherein the motor is turned on and configured to drive the lifting platform to bring the camera to move down so as to hide the camera inside the bracket when the motor receives an instruction of turning off sent by the projection-type video conference device.

3. The projection-type video conference device according to claim 1, wherein the bearing structure comprises a protective board which is arranged at a side of the bearing structure that is opposite to the lifting platform, wherein the protective board covers the bracket and is flush with a surface of the housing of the projection-type video conference device when the camera is hidden inside the bracket.

4. The projection-type video conference device according to claim 3, wherein the protective board is integrated with a pressure sensor which is configured to detect an external pressure signal when the protective board is pressed and control the motor to be turned on when a pressure value of the external pressure signal is greater than a preset threshold.

5. The projection-type video conference device according to claim 4, wherein the camera assembly is configured to determine a rotating direction of the motor according to a lifting history and a current position of the motor so that the motor is turned on to bring the screw rod to rotate, and then the screw rod brings the lifting platform and thereby the camera to move up or down.

6. The projection-type video conference device according to claim 3, wherein the protective board is provided with a button which is configured to turn on the motor to drive the screw rod to rotate when the button is pressed, so that the screw rod brings the lifting platform and thereby the camera to move up or down.

7. The projection-type video conference device according to claim 1, wherein the camera assembly further comprises a second motor which is fixed on the lifting platform, a screw rod of the second motor is connecting to the bearing structure in a clamping mode, so that the second motor is capable of bringing the lifting platform and thereby the camera to rotate.

8. A projection-type video conference system comprising projection-type video conference devices which are connected with each other, and each of the video conference devices comprising:
a camera assembly configured to acquire a panoramic video of a conference scene;
an audio input assembly configured to collect voice signals of the conference scene;
a projection assembly configured to display images or information of a conference video;
an audio output assembly configured to broadcast a voice signal of the projection assembly or a voice signal of the audio input assembly;
wherein the camera assembly is embedded in a housing of the projection-type video conference device and is liftable;
wherein the camera assembly comprises a bracket, a motor, a lifting platform and a camera, wherein the motor and the lifting platform are arranged inside the bracket, a base of the motor is fixed on a bottom surface of the bracket, the camera is arranged on the lifting platform, the lifting platform is connected to the motor and the motor is configured to drive the lifting platform to rotate so as to bring the camera to move up or down;
wherein the camera assembly further comprises a bearing structure arranged on the lifting platform and the camera is arranged on the bearing structure; the lifting platform comprises a protrusion portion and a round platform which is arranged on the protrusion portion, wherein the protrusion portion is provide with screw threads, the round platform is provided with protruding buckles at opposite sides, and the bracket is provided with slots at an inner side of the bracket that fits with the protruding buckles of the round platform, and wherein the protruding buckles is configured to slide up or down in the slots; the motor comprises a screw rod and the protrusion portion is able to be fixed to the motor by sleeving the screw rod with the protrusion portion, wherein the screw rod and the protrusion portion is respectively provided with internal screw threads and external screw threads that are matched with each other.

9. The projection-type video conference system according to claim 8, wherein the motor is turned on and configured to drive the lifting platform to bring the camera to move up so as to move out of the bracket when the motor receives an instruction of turning on sent by the projection-type video conference device; and wherein the motor is turned on and configured to drive the lifting platform to bring the camera to move down so as to hide the camera inside the bracket when the motor receives an instruction of turning off sent by the projection-type video conference device.

10. The projection-type video conference system according to claim 8, wherein the bearing structure comprises a protective board which is arranged at a side of the bearing structure that is opposite to the lifting platform, wherein the protective board covers the bracket and is flush with a surface of the housing of the projection-type video conference device when the camera is hidden inside the bracket.

11. The projection-type video conference system according to claim 10, wherein the protective board is integrated with a pressure sensor which is configured to detect an external pressure signal when the protective board is pressed and control the motor to be turned on when a pressure value of the external pressure signal is greater than a preset threshold.

12. The projection-type video conference system according to claim 11, wherein the camera assembly is configured to determine a rotating direction of the motor according to a lifting history and a current position of the motor so that the motor is turned on to bring the screw rod to rotate, and then the screw rod brings the lifting platform and thereby the camera to move up or down.

13. The projection-type video conference system according to claim 10, wherein the protective board is provided with a button which is configured to turn on the motor to drive the screw rod to rotate when the button is pressed, so that the screw rod brings the lifting platform and thereby the camera to move up or down.

14. The projection-type video conference system according to claim 8, wherein the camera assembly further comprises a second motor which is fixed on the lifting platform, a screw rod of the second motor is connecting to the bearing structure in a clamping mode, so that the second motor is capable of bringing the lifting platform and thereby the camera to rotate.

\* \* \* \* \*